United States Patent
Gaal et al.

(10) Patent No.: US 9,860,888 B2
(45) Date of Patent: Jan. 2, 2018

(54) UE CATEGORY HANDLING

(71) Applicant: QUALCOMM Incorporated, San Diego, CA (US)

(72) Inventors: Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 14/872,654

(22) Filed: Oct. 1, 2015

(65) Prior Publication Data

US 2016/0105873 A1    Apr. 14, 2016

Related U.S. Application Data

(60) Provisional application No. 62/061,617, filed on Oct. 8, 2014.

(51) Int. Cl.
*H04W 4/00* (2009.01)
*H04W 72/04* (2009.01)
(Continued)

(52) U.S. Cl.
CPC ......... *H04W 72/042* (2013.01); *H04L 1/0022* (2013.01); *H04L 1/1835* (2013.01); *H04L 5/0005* (2013.01); *H04L 27/34* (2013.01); *H04W 28/0231* (2013.01); *H04W 28/0268* (2013.01); *H04W 28/0278* (2013.01); *H04W 72/1226* (2013.01)

(58) Field of Classification Search
None
See application file for complete search history.

(56) References Cited

U.S. PATENT DOCUMENTS

2010/0008309 A1* 1/2010 Cheng .................. H04W 72/04
370/329
2010/0050034 A1* 2/2010 Che ....................... H04L 1/1845
714/748

(Continued)

OTHER PUBLICATIONS

Huawei, "Correction for Rate Matching Parameters for UE Categories 11 and 12 for 36.212", 3GPP Draft; R1-145090, 3rd Generation Partnership Project (3GPP), Mobile Competence Centre ; 650, Route Des Lucioles ; F-06921 Sophia-Antipolis Cedex ; France vol. RAN WG1, no. San Francisco, USA.

(Continued)

*Primary Examiner* — Bob Phunkulh
(74) *Attorney, Agent, or Firm* — Nerrie M. Zohn

(57) ABSTRACT

A method, an apparatus, and a computer-readable medium for wireless communication are provided. The apparatus may be a UE. The apparatus performs LBRM. Before performing LBRM, the apparatus reports a plurality of UE categories to an eNB. In addition, the apparatus determines whether signaling in relation to the UE categories is received from the eNB. In addition, the apparatus selects a UE category from the plurality of UE categories based on the reported UE categories and the signaling in relation to the UE categories. In addition, the apparatus determines a total number of soft channel bits to use for LBRM at the UE based on the selected UE category. Subsequently, the apparatus performs LBRM based on the determined total number of soft channel bits.

28 Claims, 11 Drawing Sheets

(51) Int. Cl.
*H04L 5/00* (2006.01)
*H04L 27/34* (2006.01)
*H04L 1/00* (2006.01)
*H04L 1/18* (2006.01)
H04W 28/02 (2009.01)
H04W 72/12 (2009.01)

(56) References Cited

U.S. PATENT DOCUMENTS

| | | | | |
|---|---|---|---|---|
| 2011/0276852 A1* | 11/201 | Mueller-Weinfurtner | | H04L 1/1812 714/749 |
| 2012/0087396 A1* | 4/2012 | Nimbalker | | H04L 1/1822 375/219 |
| 2012/0207130 A1 | 8/2012 | Jang et al. | | |
| 2012/0300699 A1* | 11/2012 | Kamuf | | H04L 1/1845 370/328 |
| 2013/0165183 A1* | 6/2013 | Gerstenberger | | H04L 1/1835 455/561 |
| 2014/0045497 A1* | 2/2014 | Abe | | H04L 1/0067 455/435.1 |
| 2014/0185495 A1* | 7/2014 | Kuchibhotla | | H04W 76/023 370/281 |
| 2014/0185530 A1* | 7/2014 | Kuchibhotla | | H04W 76/023 370/329 |
| 2014/0187283 A1* | 7/2014 | Nimbalker | | H04W 72/048 455/550.1 |
| 2014/0313985 A1 | 10/2014 | Nimbalker et al. | | |
| 2015/0103752 A1* | 4/2015 | Yu | | H04L 49/9005 370/329 |
| 2015/0195818 A1* | 7/2015 | Davydov | | H04L 27/3494 370/329 |
| 2015/0195819 A1* | 7/2015 | Kwon | | H04W 72/042 370/329 |
| 2016/0072612 A1* | 3/2016 | Seo | | H04L 1/1835 370/329 |

OTHER PUBLICATIONS

Huawei et al., "Discussion on Application Scenarios and Standard Impacts for UE Categories 11 and 12", 3GPP Draft; R1-143698, 3rd Generation Partnership Project (3GPP), Mobile Competence Centre ; 650, Route Des Lucioles ; F-06921 Sophia-Antipolis Cedex ; France vol. RAN WG1, no. Ljubljana, Slovenia.
Huawei et al., "Support of 256QAM in TS 36.331", 3GPP Draft; 36331 CRXXXX (REL-12) R2-144135 256QAM, 3rd Generation Partnership Project (3GPP), Mobile Competence Centre ; 650, Route Des Lucioles ; F-06921 Sophia-Antipolis Cedex ; France vol. RAN WG2, no. Shanghai, China; 20141006-20141010 Oct. 5.
International Search Report and Written Opinion—PCT/US2015/053800—ISA/EPO—Jan. 8, 2016.

* cited by examiner

UE CATEGORY HANDLING

CROSS-REFERENCE TO RELATED APPLICATION(S)

This application claims the benefit of U.S. Provisional Application Ser. No. 62/061,617, entitled "UE Category Handling in LTE" and filed on Oct. 8, 2014, which is expressly incorporated by reference herein in its entirety.

FIELD

The present disclosure relates generally to communication systems, and more particularly, to user equipment (UE) category handling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer-readable medium, and an apparatus are provided. The apparatus is for performing limited buffer rate matching (LBRM). The apparatus may be a user equipment (UE). The apparatus reports a plurality of UE categories to an evolved Node B (eNB). The apparatus determines whether signaling in relation to the UE categories is received from the eNB. The apparatus selects a UE category from the plurality of UE categories based on the reported UE categories and the signaling in relation to the UE categories. The apparatus determines a total number of soft channel bits to use for LBRM at the UE based on the selected UE category. Further, the apparatus performs LBRM based on the determined total number of soft channel bits.

DETAILED DESCRIPTION

Figure 1:
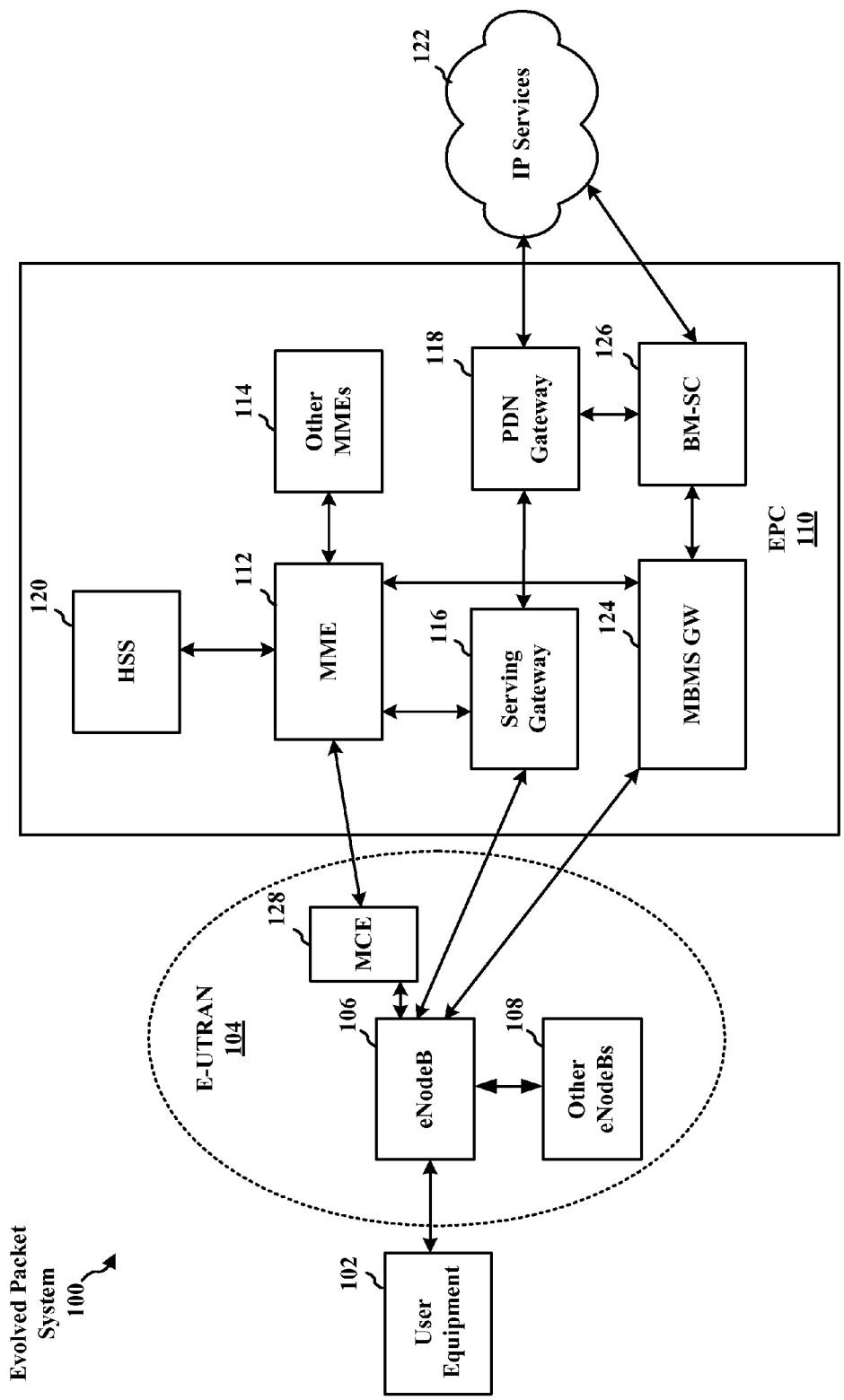
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a public land mobile network (PLMN), and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
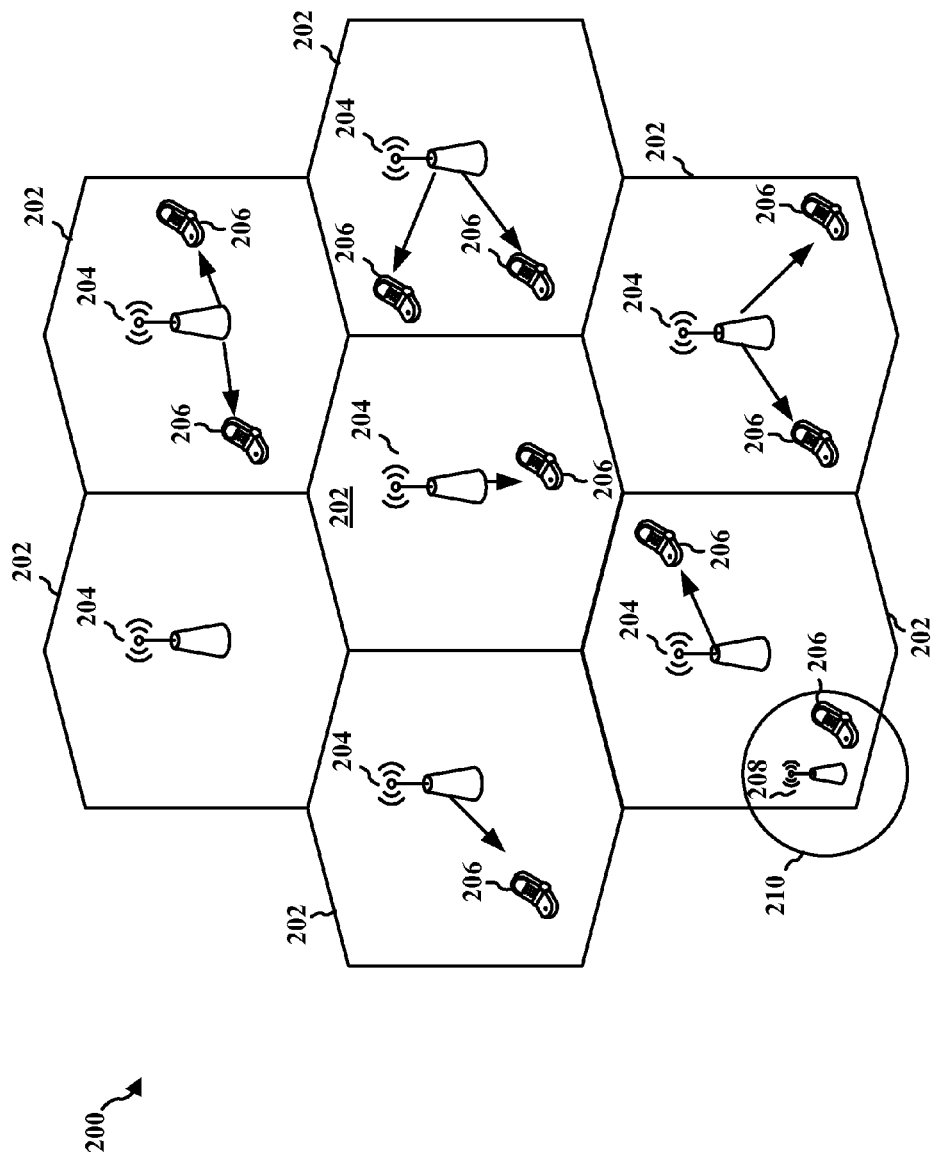
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
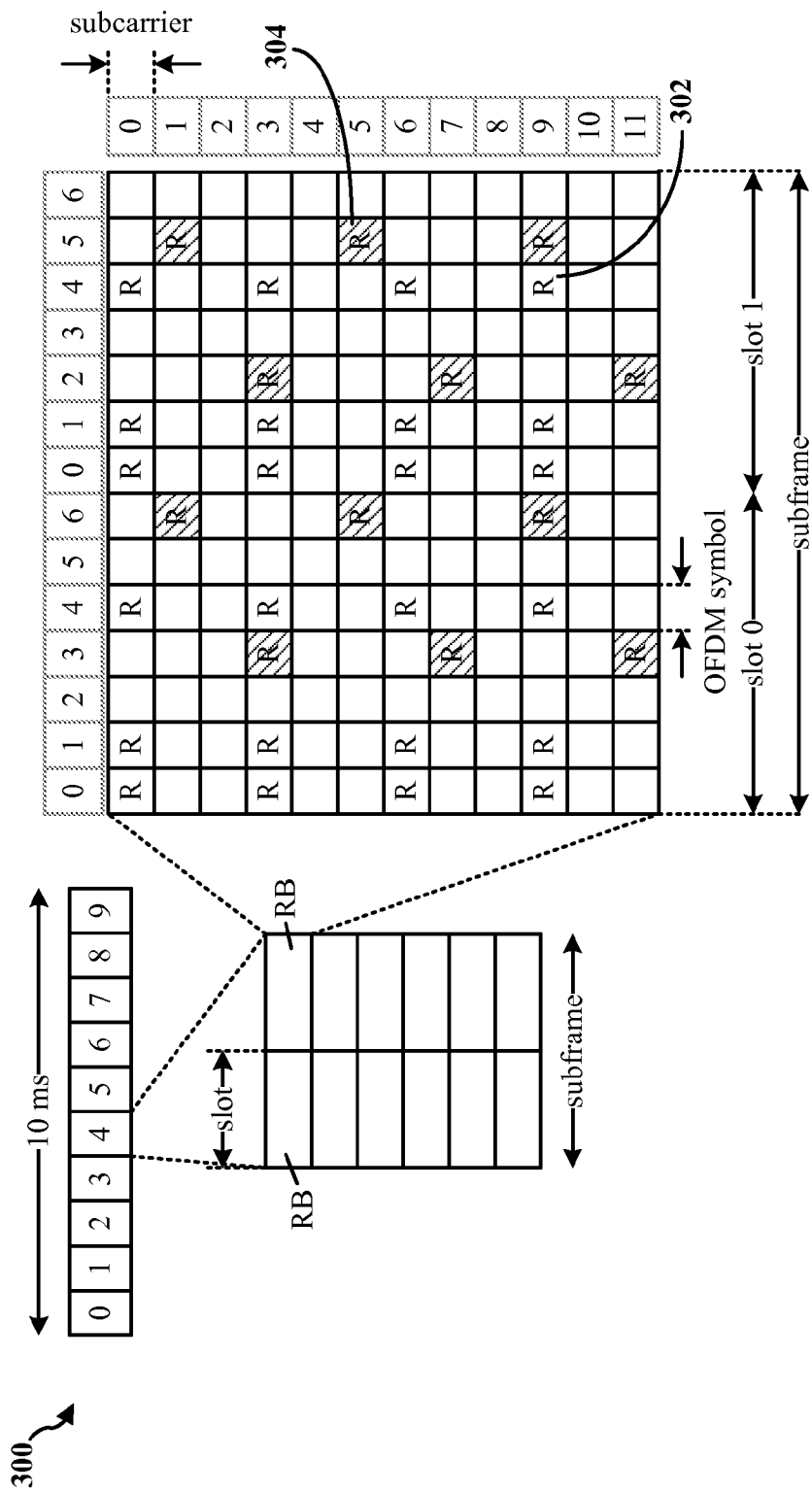
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
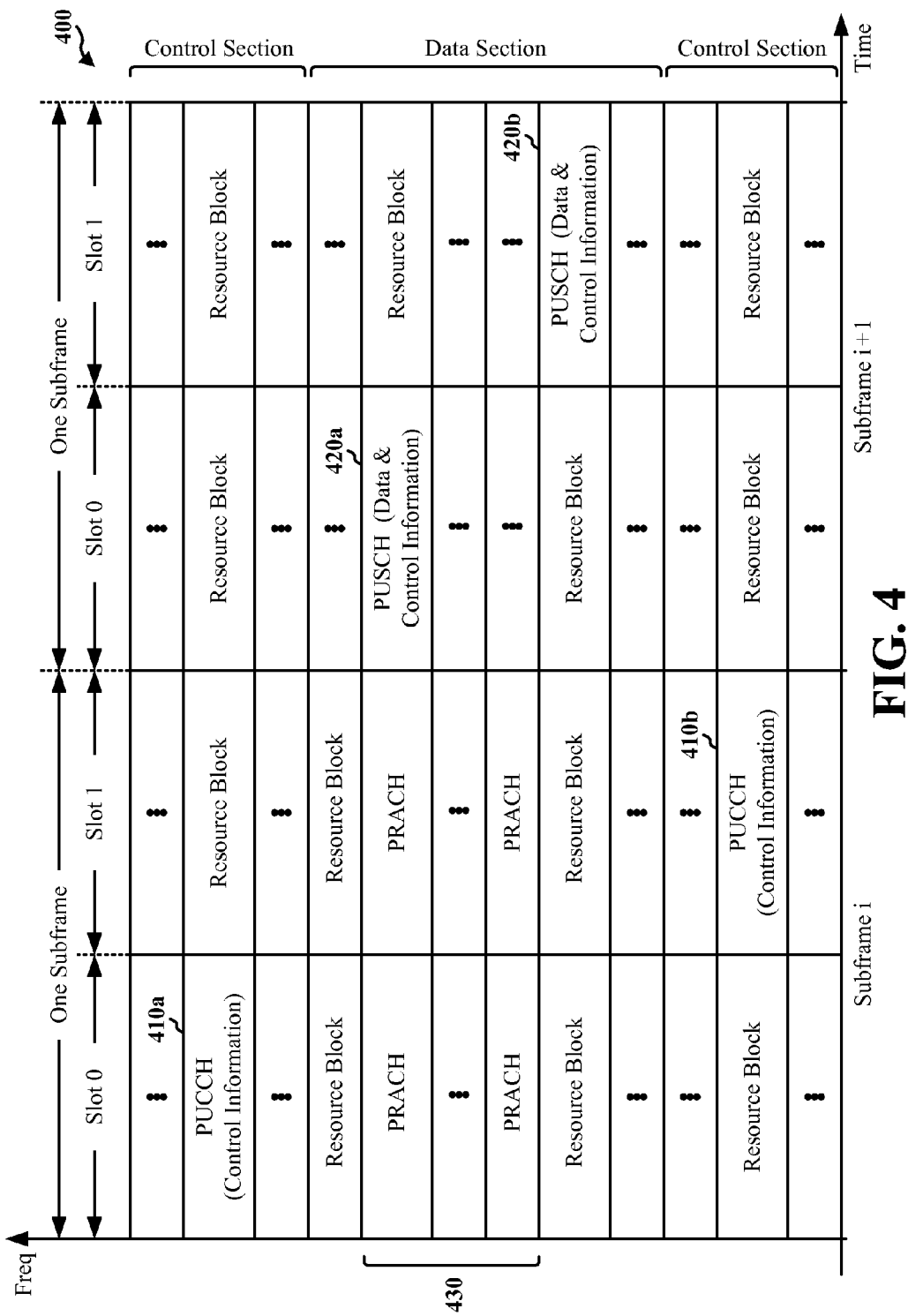
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
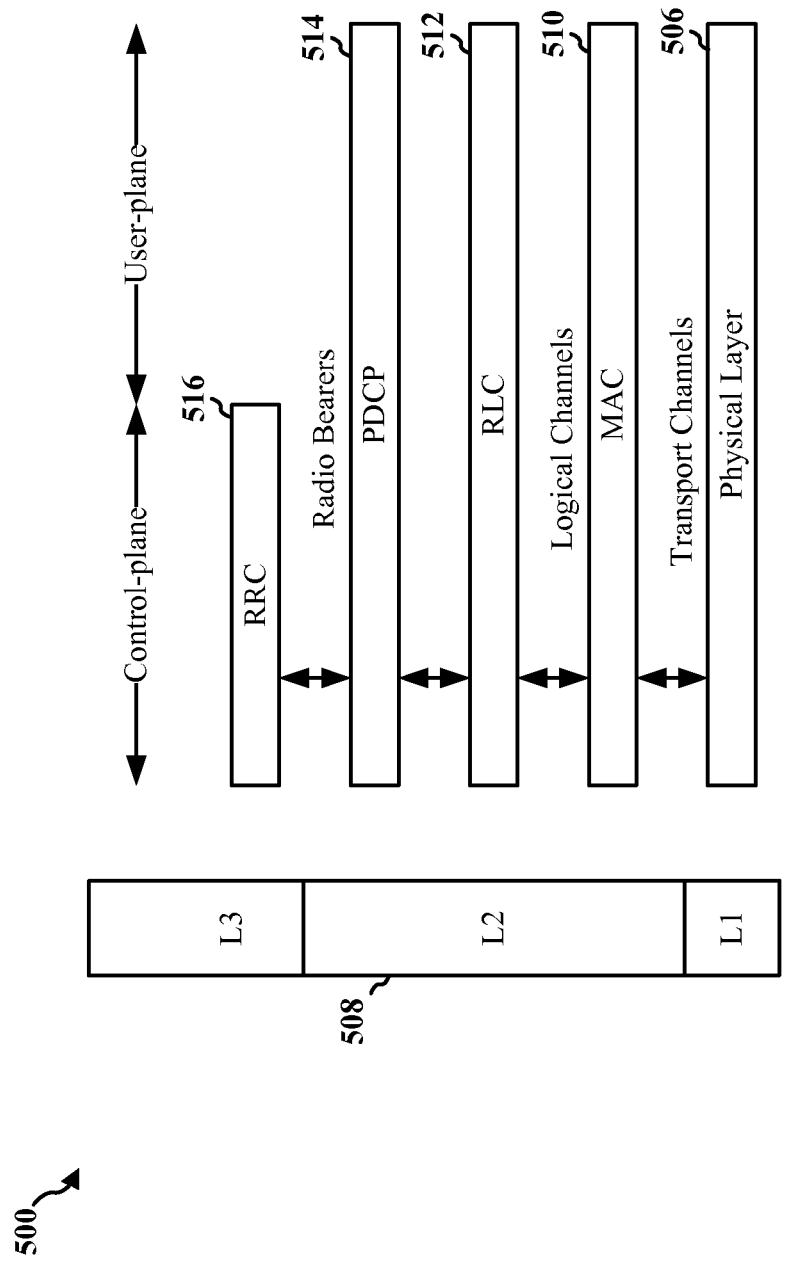
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
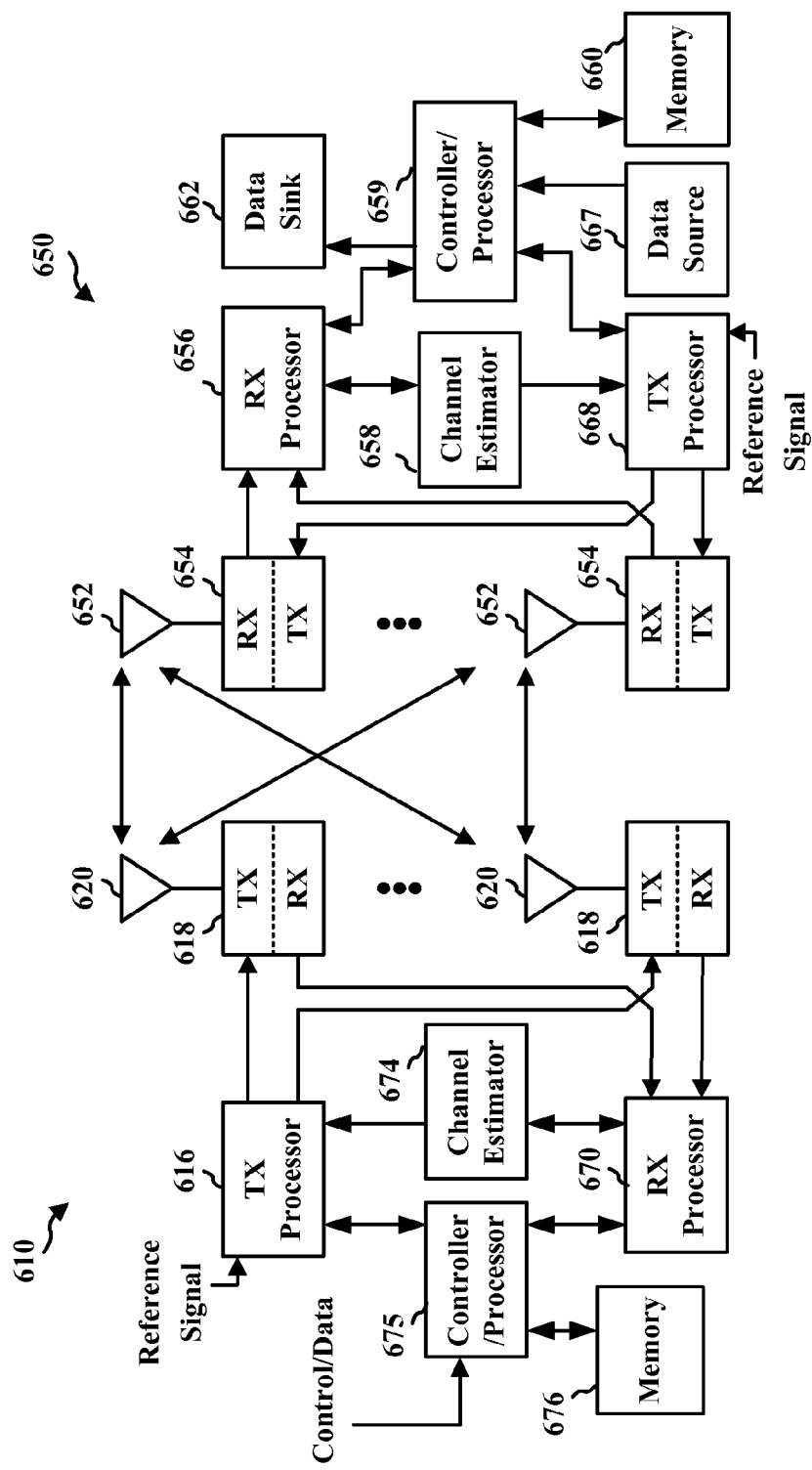
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor 659 can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7A:
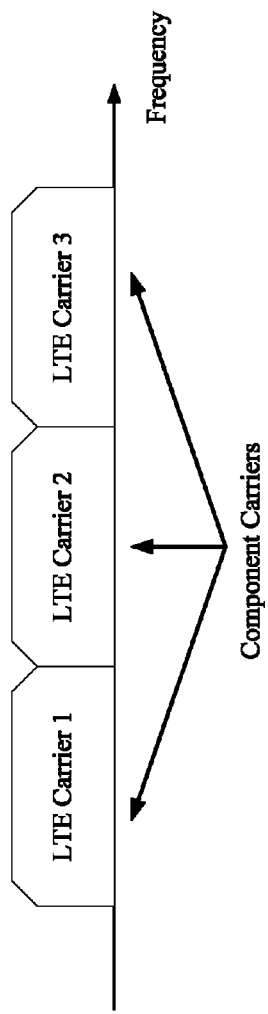
FIG. 7A is a diagram illustrating an example of continuous carrier aggregation.
Figure 7B:
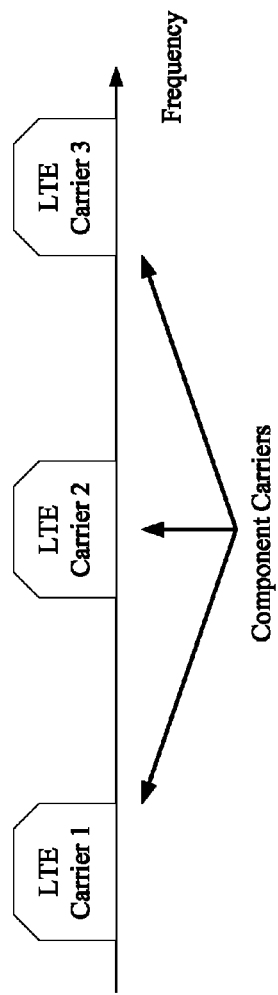
FIG. 7B is a diagram illustrating an example of non-continuous carrier aggregation.

FIG. 7A discloses a continuous carrier aggregation type. FIG. 7B discloses a non-continuous carrier aggregation type. A UEs may use spectrum up to 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 Mhz. These asymmetric FDD assignments conserve spectrum and are a good fit for the typically asymmetric bandwidth utilization by broadband subscribers. Two types of carrier aggregation (CA) methods have been proposed, continuous CA and non-continuous CA. The two types of CA methods are illustrated in FIGS. 7A and 7B. Non-continuous CA occurs when multiple available component carriers are separated along the frequency band (FIG. 7B). On the other hand, continuous CA occurs when multiple available component carriers are adjacent to each other (FIG. 7A). Both non-continuous and continuous CA aggregates multiple LTE/component carriers to serve a single UE. The component carriers may include a primary component carrier and one or more secondary component carriers. A primary component carrier may be referred to as a primary cell (Pcell) and a secondary component carrier may be referred to as a secondary cell (SCell).

For FDD, TDD, and FDD-TDD, upon a decoding failure of a code block of a transport block, a UE may store received soft channel bits for HARQ processing. The total number of soft channel bits ($N_{soft}$) that a UE may store for HARQ processing may vary depending on the UE category of the UE. A UE may indicate its UE category for various LTE releases to a serving eNB. For example, an LTE Release 12 (Rel-12) UE may indicate one or more of a UE category of Rel-12 UE categories, a UE category of LTE Release 11 (Rel-11) UE categories, a UE category of LTE Release 10 (Rel-10) UE categories, and a UE category of LTE Release 8 (Rel-8) UE categories.

In LTE Rel-8, five UE categories are defined:

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |

Where the total number of soft channel bits is used to manage a soft buffer for DL HARQ operation at an eNB and a UE. For LTE Rel-8, a UE may have UE category 1, 2, 3, 4, or 5, and may indicate its UE category for the LTE Rel-8 to a serving eNB.

In LTE Rel-10, UE categories 6, 7, and 8 were introduced:

| UE Category | Maximum number of DL-SCH transport block bits received within a TTI (Note) | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers) 75376 (2 layers) | 3654144 | 2 or 4 |
| Category 7 | 301504 | 149776 (4 layers) 75376 (2 layers) | 3654144 | 2 or 4 |
| Category 8 | 2998560 | 299856 | 35982720 | 8 |

(Note):

In carrier aggregation operation, the DL-SCH processing capability can be shared by the UE with that of MCH received from a serving cell. If the total eNB scheduling for DL-SCH and an MCH in one serving cell at a given TTI is larger than the defined processing capability, the prioritization between DL-SCH and MCH is left up to UE implementation.

For LTE Rel-10, a UE may have UE category 6, 7, or 8, and may indicate its UE category for the LTE Rel-10 to a serving eNB. As such, a UE operating under LTE Rel-10 may indicate/signal a UE category of 1, 2, 3, 4, or 5 for LTE Rel-8 (for eNBs operating under LTE Rel-8), and a UE category of 6, 7, or 8 for LTE Rel-10 (for eNBs operating under LTE Rel-10).

A Rel-10 UE can indicate/signal a maximum two UE categories with the following possible combinations: Combination 1, which includes UE category 5 ($N_{soft}$=3667200) and UE category 8 (8 layers) ($N_{soft}$=35982720); Combination 2, which includes UE category 4 ($N_{soft}$=1827072), and UE category 6 or 7 (2 layers) ($N_{soft}$=1827072) (there is no ambiguity here because $N_{soft}$ is the same for the categories); and Combination 3, which includes UE category 4 ($N_{soft}$=1827072), and UE category 6 or 7 (4 layers) ($N_{soft}$=3654144).

A UE decides which $N_{soft}$ value to use for limited buffer rate matching (LBRM) in case of the combination 1 and 3. Conventionally, a UE may use $N_{soft}$ of the higher UE category when either CA or transmission mode 9 (TM9) is configured. The conventional implementation may have limited performance impact for other transmissions modes as a smaller soft buffer size is assumed. Note that this does not imply that the UE can make assumptions about network "release" (the LTE release version employed by the network).

In LTE Rel-11, UE categories 9 and 10 were introduced:

| UE Category | Maximum number of DL-SCH transport block bits received within a TTI (Note) | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers) 75376 (2 layers) | 3654144 | 2 or 4 |
| Category 7 | 301504 | 149776 (4 layers) 75376 (2 layers) | 3654144 | 2 or 4 |
| Category 8 | 2998560 | 299856 | 35982720 | 8 |
| Category 9 | 452256 | 149776 (4 layers) 75376 (2 layers) | 5481216 | 2 or 4 |
| Category 10 | 452256 | 149776 (4 layers) 75376 (2 layers) | 5481216 | 2 or 4 |

(Note):
In carrier aggregation operation, the DL-SCH processing capability can be shared by the UE with that of MCH received from a serving cell. If the total eNB scheduling for DL-SCH and an MCH in one serving cell at a given TTI is larger than the defined processing capability, the prioritization between DL-SCH and MCH is left up to UE implementation.

In LTE Rel-12, UE categories 6, 7 may indicate support for 256QAM. The field "Total number of soft channel bits" is unchanged. Two fields in UE category "Maximum number of DL-SCH transport block bits received within a TTI" and "Maximum number of bits of a DL-SCH transport block received within a TTI" are updated to support 256QAM peak data rate. Two new UE categories (11 and 12) based on data rates of "categories 9, 10+additional 256QAM" (approximately 600 Mbps) are introduced. The new UE categories may have an optional support of 256QAM. Existing categories except for 6 and 7 may be unchanged. UE category 13 may be supported based on UE category 8.

| UE Category | Maximum number of DL-SCH transport block bits received within a TTI (Note) | Maximum number of bits of a DL-SCH transport block received within a TTI | Total number of soft channel bits | Maximum number of supported layers for spatial multiplexing in DL |
|---|---|---|---|---|
| Category 0 (Note 2) | 1000 | 1000 | 25344 | 1 |
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 (—) 391632 (256QAM configured; FFS if it is applicable to UEs without | 149776 (4 layers, 64QAM) 195816 (4 layers, 256QAM) 75376 (2 layers, 64QAM) 97896 (2 layers, 256QAM) | 3654144 | 2 or 4 |

-continued

| UE Category | Maximum number of DL-SCH transport block bits received within a TTI (Note) | Maximum number of bits of a DL-SCH transport block received within a TTI | Total number of soft channel bits | Maximum number of supported layers for spatial multiplexing in DL |
|---|---|---|---|---|
| Category 7 | 301504(—) 391632 (256QAM configured; FFS if it is applicable to UEs without 256QAM configuration or capability) 256QAM configuration or capability) | 149776 (4 layers, 64QAM) 195816 (4 layers, 256QAM) 75376 (2 layers, 64QAM) 97896 (2 layers, 256QAM) | 3654144 | 2 or 4 |
| Category 8 | 2998560 | 299856 | 35982720 | 8 |
| Category 9 | 452256 | 149776 (4 layers) 75376 (2 layers) | 5481216 | 2 or 4 |
| Category 10 | 452256 | 149776 (4 layers) 75376 (2 layers) | 5481216 | 2 or 4 |
| Category 11 | 603008 | 149776 (4 layers, 64QAM) 195816 (4 layers, 256QAM) 75376 (2 layers, 64QAM) 97896 (2 layers, 256QAM) | 7308288 | 2 or 4 |
| Category 12 | 603008 | 149776 (4 layers, 64QAM) 195816 (4 layers, 256QAM) 75376 (2 layers, 64QAM) 97896 (2 layers, 256QAM) | 7308288 | 2 or 4 |
| Category 13 | 3916560 | 391656 | 47431680 | 8 |

(Note):
In carrier aggregation operation, the DL-SCH processing capability can be shared by the UE with that of MCH received from a serving cell. If the total eNB scheduling for DL-SCH and an MCH in one serving cell at a given TTI is larger than the defined processing capability, the prioritization between DL-SCH and MCH is left up to UE implementation.

A Rel-12 UE indicating UE category 6 or 7 may also indicate UE category 4 (combinations 6,4 or 7,4). A UE indicating UE category 8 may also indicate UE category 5 (combination 8,5). A UE indicating UE category 9 may also indicate UE category 6 and 4 (combination 9,6,4). A UE indicating UE category 10 may also indicate UE category 7 and 4 (combination 10,7,4). A UE indicating UE category 11 may also indicate UE category 9, 6, and 4 (combination 11,9,6,4). A UE indicating UE category 12 may also indicate UE category 10, 7, and 4 (combination 12,10,7,4). A UE indicating UE category 13 may also indicate UE category 8 and 5 (combination 13,8,5). Thus, each new UE category may be integrated with a legacy combination of UE categories.

Figure 8:
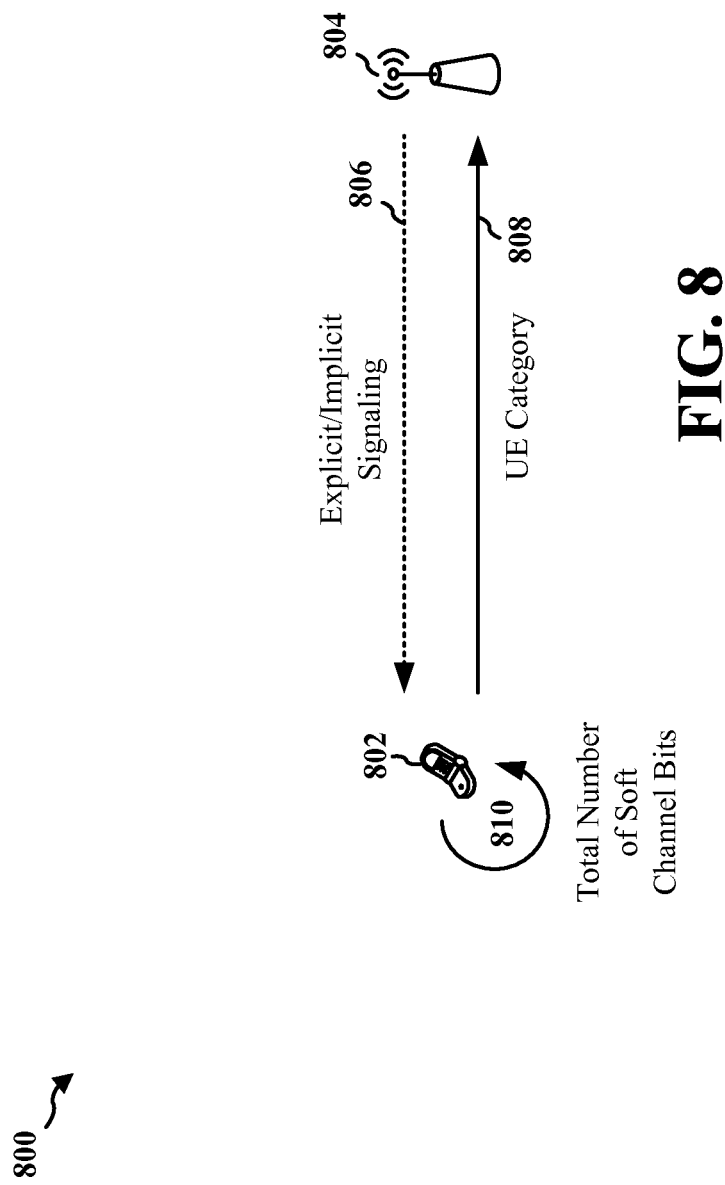
FIG. 8 is a diagram illustrating an exemplary UE category handling.

FIG. 8 is a diagram 800 illustrating an exemplary UE category handling. The diagram 800 illustrates that a UE 802 may receive 806 explicit/implicit signaling, may signal/indicate 808 one or more UE categories to an eNB 804, and may determine 810 a total number of soft channel bits based on whether the signaling is received 806 (or based on the particular signaling that is received 806) and/or the one or more UE categories signaled/indicated 808 to the eNB 804. The signaling may be a configured higher layer (e.g., RRC layer) parameter. In one example, the signaling may be the higher layer parameter associated with an alternative CQI table. For example, the higher layer parameter may be altCQI-Table-r12, which may be set to allSubframes (the alternative CSI table applies to all subframes), csi-SubframeSet1 (the alternative CSI table applies to CSI subframe set1), or csi-SubframeSet2 (the alternative CSI table applies to CSI subframe set2).

If a UE 802 receives 806 specific signaling and the UE signals 808 UE category 11 or 12, the UE 802 may determine 810 the total number of soft channel bits based on the corresponding specified total number of soft channel bits for the UE category 11 or 12 in the tables discussed supra. However, if the UE does not signal 808 a Rel-12 UE category (which includes UE categories 11 and 12), and/or the UE 802 does not receive 806 such specific signaling, the UE 802 may determine 810 the total number of soft channel bits based on a different UE category other than the Rel-12 UE categories (e.g., UE category 11 and 12).

Assume the UE 802 determines 810 the total number of soft channel bits based on a different UE category other than the Rel-12 UE categories (i.e., the above requirements are not met for determining the total number of soft channel bits based on the Rel-12 UE categories). If the UE 802 receives 806 specific signaling and the UE signals 808 UE category 9 or 10, the UE 802 may determine 810 the total number of soft channel bits based on the corresponding specified total number of soft channel bits for the UE category 9 or 10 in the tables discussed supra. However, if the UE does not signal 808 UE category 9 or 10, and/or the UE 802 does not receive 806 such specific signaling, the UE 802 may determine 810 the total number of soft channel bits based on a different UE category other than UE category 9 and 10.

Assume the UE 802 determines 810 the total number of soft channel bits based on a different UE category other than Rel-12 and Rel-11 UE categories (e.g., UE category 9, 10, 11, and 12) (i.e., the above requirements are not met for determining the total number of soft channel bits based on the UE categories 9, 10, 11, and 12). If the UE signals 808 UE category 6, 7, or 8, and is configured with a transmission mode of a particular set of transmission modes (e.g., TM9 or transmission mode 10 (TM10)), the UE 802 may determine 810 the total number of soft channel bits based on the corresponding specified total number of soft channel bits for the UE category 6, 7, or 8 in the tables discussed supra.

Otherwise, if the UE does not signal 808 UE category 6, 7, or 8, and/or is not configured with a transmission mode of the particular set of transmission modes (e.g., TM9 or TM10), the UE 802 may determine 810 the total number of soft channel bits based on the corresponding specified total number of soft channel bits for a Rel-8 UE category (e.g., UE category 1, 2, 3, 4, or 5 in the tables discussed supra).

As discussed supra, a UE may determine 810 a total number of soft channel bits (i.e., $N_{soft}$ value) based on whether specific signaling is received 806. The aforementioned specific signaling may be considered implicit signaling that is explicitly received. However, generally, a UE may decide which $N_{soft}$ value to use for LBRM based on explicit signaling and/or mixed explicit signaling and implicit signaling. The explicit signaling may include information indicating which $N_{soft}$ value to use when the UE indicates a combination of different UE categories (e.g., for a Rel-12 UE, including one UE category for Rel-12, one UE category for Rel-11, one UE category for Rel-10, and one UE category for Rel-8). For example, a UE indicating categories 11, 9, 6, and 4 may further receive explicit signaling indicating which $N_{soft}$ value should be used of the UE categories 11, 9, 6, and 4.

With respect to mixed explicit signaling and implicit signaling (e.g., existing UE network configuration properties), in a first configuration, if a UE is configured with Rel-12 256QAM, the UE may assume (based on implicit signaling) an $N_{soft}$ value (e.g., 7308288) corresponding to UE category 11/12. The higher layer parameter alternative CQI table may only be received if the UE is configured with Rel-12 256QAM. Accordingly, the UE may determine whether the aforementioned signaling in relation to the UE categories is received 806 from the eNB 804 based on whether the UE is configured with Rel-12 256QAM. Otherwise, if the UE is not configured with Rel-12 256QAM, the UE may receive explicit signaling to determine whether the $N_{soft}$ value is based on UE category 11/12 or not. If the explicit signaling indicates that the $N_{soft}$ value is not based on the UE category 11/12, the UE may further look at whether the UE is configured with CA, TM9, or TM10 to determine whether to use the $N_{soft}$ value corresponding to UE categories 6 or 4. For example, if the UE is configured with CA, TM9, or TM10, the UE may use the $N_{soft}$ value (e.g., 3654144) corresponding to UE category 6; otherwise, if the UE is not configured with CA, TM9, or TM10, the UE may use the $N_{soft}$ value (e.g., 1827072) corresponding to the UE category 4. In a second configuration, a UE may receive explicit signaling on whether the $N_{soft}$ value corresponds to UE category 11/12. If the explicit signaling indicates that the $N_{soft}$ value does correspond to UE category 11/12, the UE uses the corresponding $N_{soft}$ value (e.g., 7308288). However, if the explicit signaling indicates that the $N_{soft}$ value does not correspond to the UE category 11/12 and the UE is configured with CA, TM9, or TM10, the UE may assume the $N_{soft}$ value (e.g., 3654144) corresponds to UE category 6. Otherwise, if the explicit signaling indicates that the $N_{soft}$ value does not correspond to the UE category 11/12 and the UE is not configured with CA, TM9, or TM10, the UE may assume the $N_{soft}$ value (e.g., 1827072) corresponds to UE category 4.

With respect to implicit signaling only, in a first configuration, if a UE is configured with Rel-12 256QAM, the UE may assume an $N_{soft}$ value (e.g., 7308288) corresponding to UE category 11/12. However, if the UE is not configured with Rel-12 256QAM, and the UE is configured with enhanced PDCCH (EPDCCH), TDD CA with different UL/DL configurations, further enhanced inter-cell interference coordination (feICIC), enhanced interference mitigation and traffic adaptation (eIMTA), a newer MIMO codebook, or the like, the UE may assume an $N_{soft}$ value (e.g., 7308288) corresponding to UE category 11/12. Otherwise, if the UE is not configured with the aforementioned configurations (EPDCCH, TDD CA with different UL/DL configurations, feICIC, eIMTA, a newer MIMO codebook), and the UE is configured with CA, TM9, or TM10, the UE may assume an $N_{soft}$ value (e.g., 3654144) corresponding to UE category 6. Otherwise, if the UE is not configured with the aforementioned configurations (EPDCCH, TDD CA with different UL/DL configurations, feICIC, eIMTA, a newer MIMO codebook, CA, TM9, TM10), the UE may assume an $N_{soft}$ value (e.g., 1827072) corresponding to UE category 4. In a second configuration, if the UE is configured with EPDCCH, TDD CA with different UL/DL configurations, feICIC, eIMTA, a newer MIMO codebook, or the like, the UE may assume an $N_{soft}$ value (e.g., 7308288) corresponding to UE category 11/12. Otherwise, if the UE is not configured with the aforementioned configurations (EPDCCH, TDD CA with different UL/DL configurations, feICIC, eIMTA, a newer MIMO codebook), and the UE is configured with CA, TM9, or TM10, the UE may assume an $N_{soft}$ value (e.g., 3654144) corresponding to UE category 6. Otherwise, if the UE is not configured with the aforementioned configurations (EPDCCH, TDD CA with different UL/DL configurations, feICIC, eIMTA, a newer MIMO codebook, CA, TM9, TM10), the UE may assume an $N_{soft}$ value (e.g., 1827072) corresponding to UE category 4.

Referring again to FIG. 8, if a UE signals 808 a Rel-12 UE category 11 or 12, and is configured 806 by higher layers (implicit signaling) with altCQI-Table-r12 for the DL cell, $N_{soft}$ is the total number of soft channel bits according to the signaled UE category 11 or 12 (see tables supra). Otherwise, if the UE signals 808 a Rel-11 UE category 9 or 10, and is configured 806 by higher layers (implicit signaling) with altCQI-Table-r12 for the DL cell, $N_{soft}$ is the total number of soft channel bits according to the signaled UE category 9 or 10 (see tables supra). Otherwise, if the UE signals 808 a Rel-10 UE category 6, 7, or 8, and is configured with TM9 or TM10 for the DL cell, $N_{soft}$ is the total number of soft channel bits according to the signaled UE category 6, 7, or 8. Otherwise, $N_{soft}$ is the total number of soft channel bits according to the signaled 808 Rel-8 UE category 1, 2, 3, 4, or 5.

Figure 9:
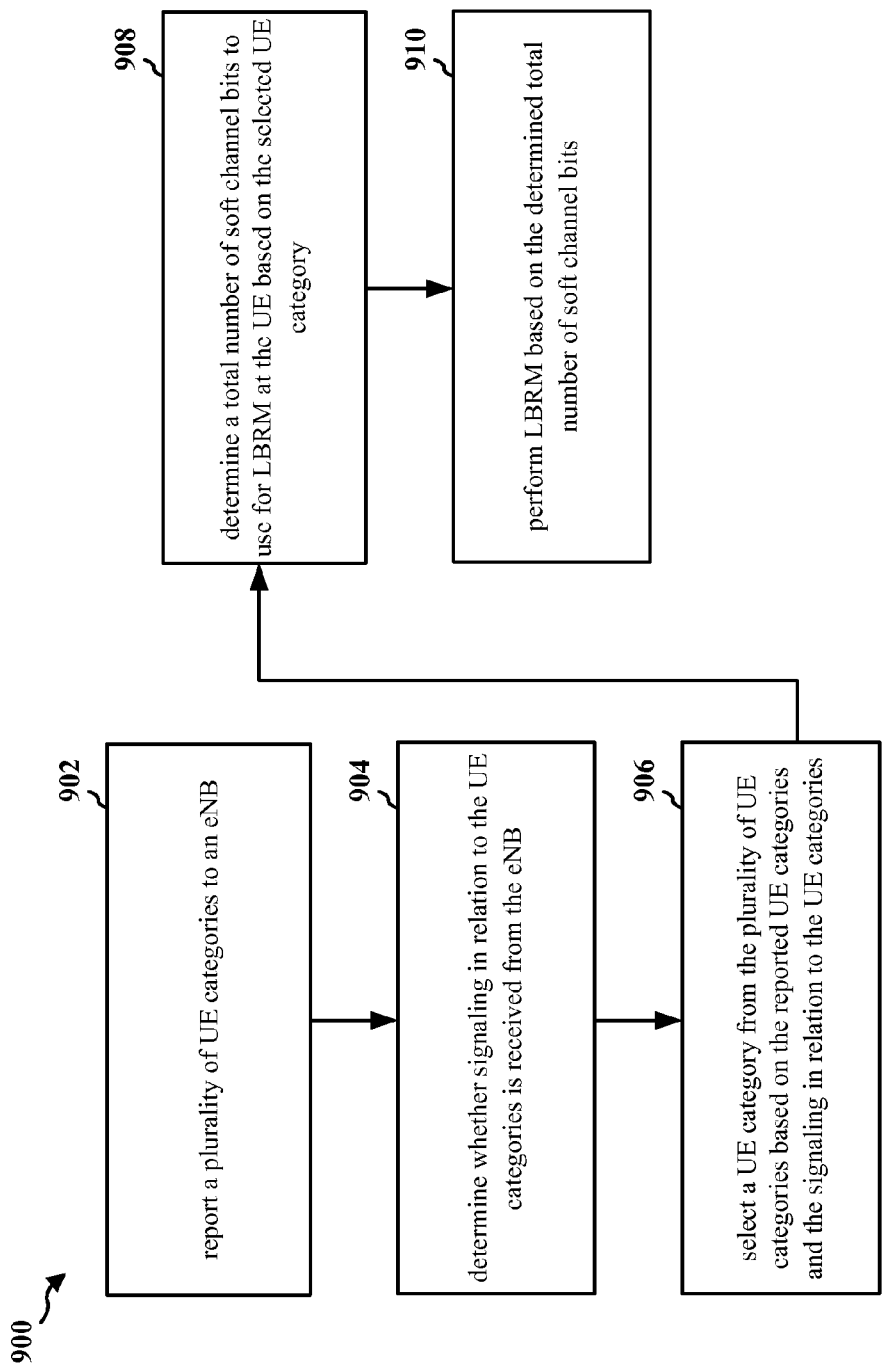
FIG. 9 is a flowchart of a method for performing limited buffer rate matching.

FIG. 9 is a flowchart 900 of a method for performing LBRM. The method may be performed by a UE (e.g., the UE 802, the apparatus 1002/1002').

At 902, a UE reports a plurality of UE categories to an eNB. For example, a UE may report a UE category for Rel-8 (e.g., UE category 1, 2, 3, 4, or 5), a UE category for Rel-10 (e.g., UE category 6, 7, or 8), a UE category for Rel-11 (e.g., UE category 9 or 10), and/or a UE category for Rel-12 (e.g., UE category 11 or 12). For another example, any of combinations 6,4; 7,4; 8,5; 9,6,4; 10,7,4; 11,9,6,4; 12,10,7,4; or 13,8,5 may be reported.

At 904, the UE determines whether signaling in relation to the UE categories is received from the eNB. Such signaling may be a configured higher layer (e.g., RRC layer) parameter. In one example, the signaling may be the higher layer parameter alternative CQI table, such as altCQI-Table-r12. In one configuration, the UE may determine whether the UE is configured with 256 QAM. In 904, the UE may determine the signaling in relation to the UE categories is received from the eNB when the UE is configured with 256 QAM.

At 906, the UE selects a UE category from the plurality of UE categories based on the reported UE categories and the signaling in relation to the UE categories. For example, if the UE reports a Rel-12 UE category 11 or 12, and receives signaling (e.g., altCQI-Table-r12), the UE may select UE category 11 or 12. For another example, if the UE does not report a Rel-12 UE category and/or does not receive signaling, and the UE reports a Rel-11 UE category 9 or 10, the UE may select UE category 9 or 10.

At 908, the UE determines a total number of soft channel bits $N_{soft}$ to use for LBRM at the UE based on the selected UE category. For example, if the UE selects the UE category 11 or 12, the UE may determine the total number of soft channel bits $N_{soft}$ to be 7308288. For another example, if the UE selects the UE category 9 or 10, the UE may determine the total number of soft channel bits $N_{soft}$ to be 5481216.

Subsequently, at 910, the UE performs LBRM based on the determined total number of soft channel bits $N_{soft}$. To perform LBRM, the UE stores received soft channel bits for HARQ processing. The UE stores at most $N_{soft}$ soft channel bits for the HARQ processing. The UE then performs the LBRM based on the stored soft channel bits, where the number of soft channel bits on which the LBRM is performed is less than or equal to $N_{soft}$.

As discussed supra, a UE may select UE category 11 or UE category 12 from the plurality of UE categories when at least one of the UE category 11 or the UE category 12 is reported to the eNB, and the signaling is received from the eNB. Further, the UE may determine the total number of soft channel bits to use for LBRM at the UE based on the selected UE category 11 or the UE category 12.

As discussed supra, the UE category may be selected further based on whether TM9 is configured for the UE when the signaling is not received from the eNB. In one configuration, the UE category 6 is selected when transmission mode 9 is configured for the UE and the signaling is not received from the eNB. In one configuration, the UE category 4 is selected when TM9 is unconfigured for the UE the signaling is not received from the eNB.

Figure 10:
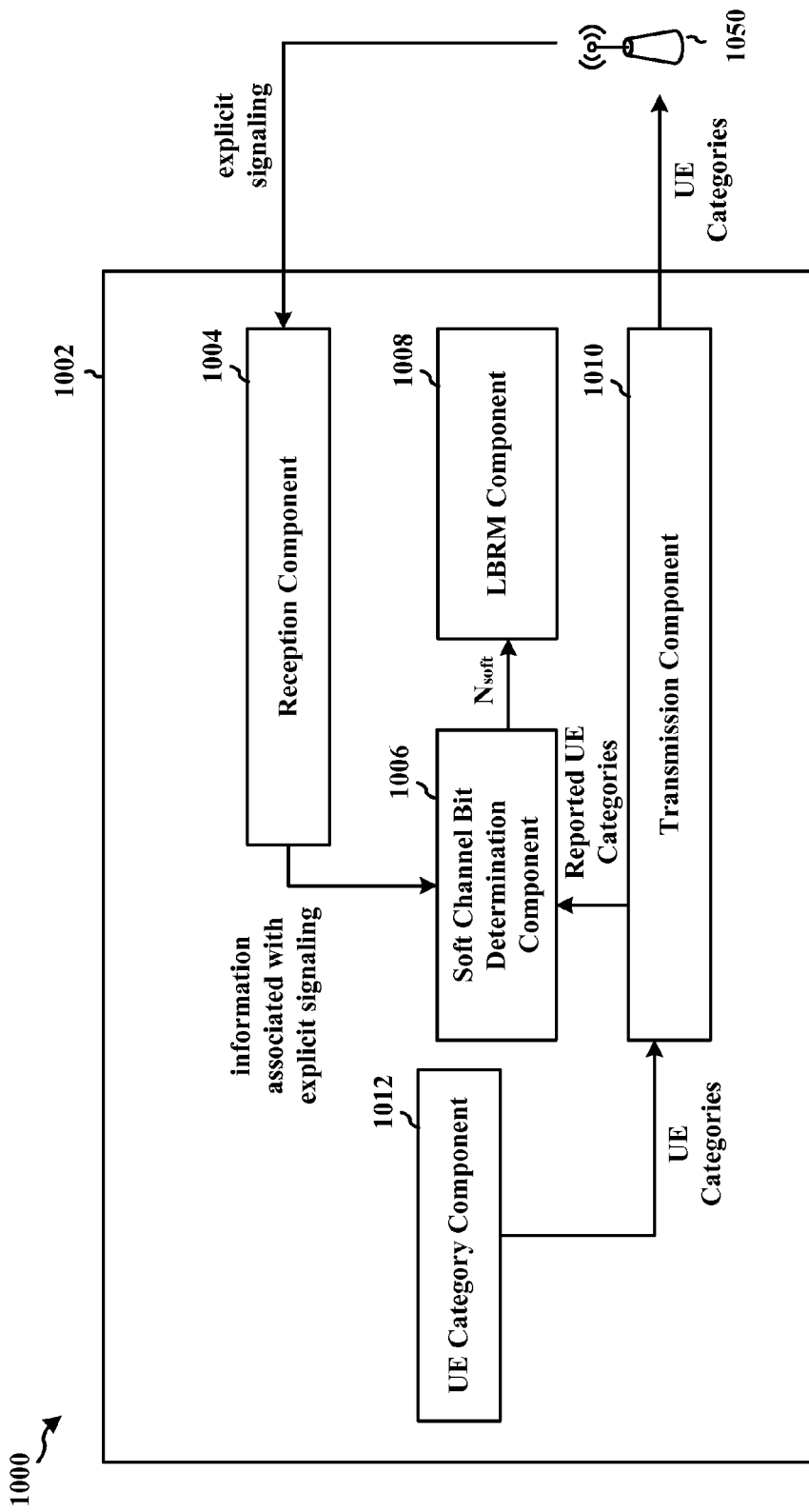
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE. The apparatus includes reception component 1004, a soft channel bit determination component 1006, an LBRM component 1008, a transmission component 1010, and a UE category component 1012. The UE category component 1012 is configured to determine a plurality of categories and to provide information indicating the plurality of categories to the transmission component 1010. The transmission component 1010 is configured to report the plurality of UE categories to an eNB 1050. The transmission component 1010 provides information indicating the reported UE categories to the soft channel bit determination component 1006. The reception component 1004 is configured to receive signaling from the eNB 1050. The reception component 1004 is configured to provide information associated with the signaling to the soft channel bit determination component 1006. Such information may be the particular signaling and/or information indicating whether such particular signaling was received. The soft channel bit determination component 1006 is configured to determine whether signaling in relation to the UE categories is received from the eNB. The soft channel bit determination component 1006 is configured to select a UE category from the plurality of UE categories based on the reported UE categories and the signaling in relation to the UE categories. In addition, the soft channel bit determination component 1006 is configured to determine a total number of soft channel bits to use for LBRM at the UE based on the selected UE category. The soft channel bit determination component 1006 is configured to provide information indicating the total number of soft channel bits $N_{soft}$ to the LBRM component 1008. The LBRM component 1008 is configured to perform LBRM based on the determined total number of soft channel bits.

In one configuration, the UE/soft channel bit determination component 1006 is configured to select UE category 11 or UE category 12 from the plurality of UE categories when at least one of the UE category 11 or the UE category 12 is reported to the eNB, and the signaling is received from the eNB. In one configuration, the UE/soft channel bit determination component 1006 is configured to determine the total number of soft channel bits to use for LBRM at the UE based on the selected UE category 11 or the UE category 12. In one configuration, the UE category is selected by the soft channel bit determination component 1006 further based on whether transmission mode 9 is configured for the UE when the signaling is not received from the eNB. In one configuration, the UE category 6 is selected by the soft channel bit determination component 1006 when transmission mode 9 is configured for the UE and the signaling is not received from the eNB. In one configuration, the UE category 4 is selected by the soft channel bit determination component 1006 when transmission mode 9 is unconfigured for the UE and the signaling is not received from the eNB.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
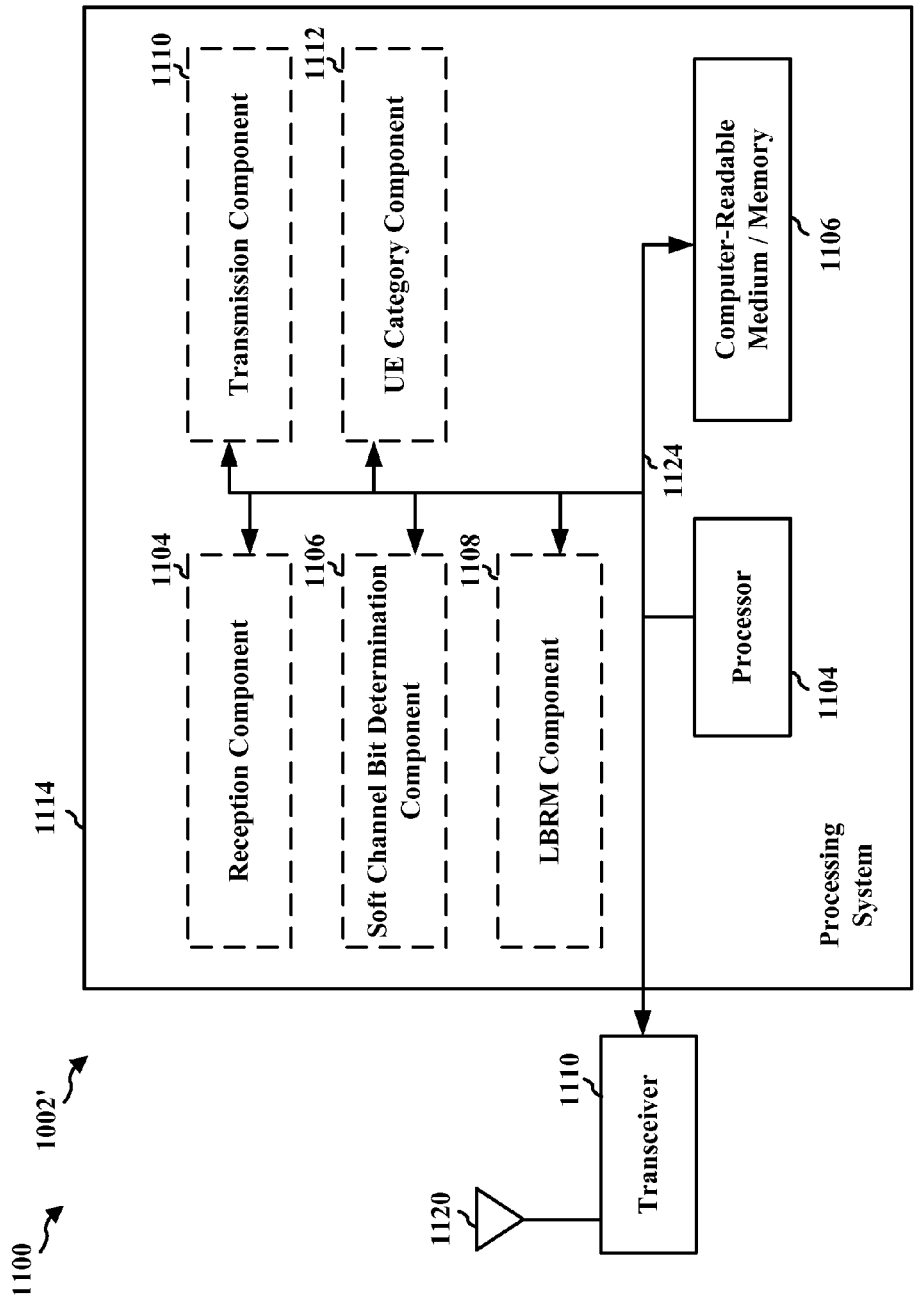
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the UE 650 and may include the memory 660 and/or at least one of the TX processor 668, the RX processor 656, and the controller/processor 659.

In one configuration, the apparatus 1002/1002' for performing LBRM by a UE includes means for reporting a plurality of UE categories to an eNB. In addition, the apparatus includes means for determining whether signaling in relation to the UE categories is received from the eNB. In addition, the apparatus includes means for selecting a UE category from the plurality of UE categories based on the reported UE categories and the signaling in relation to the UE categories. In addition, the apparatus includes means for determining a total number of soft channel bits to use for LBRM at the UE based on the selected UE category. Further, the apparatus includes means for performing LBRM based on the determined total number of soft channel bits. In one configuration, the apparatus may further include means for determining whether the UE is configured with 256 QAM. In such a configuration, the signaling in relation to the UE categories may be determined by the UE to be received from the eNB when the UE is configured with 256 QAM.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for performing limited buffer rate matching (LBRM) by a user equipment (UE), comprising:
   reporting a plurality of UE categories to an evolved Node B (eNB);
   determining whether signaling in relation to the UE categories indicates a particular channel quality information (CQI) table;
   selecting a highest UE category from the plurality of UE categories when said signaling indicates the particular CQI table;
   selecting a UE category other than the highest UE category from the plurality of UE categories when said signaling does not indicate the particular CQI table;
   determining a total number of soft channel bits to use for LBRM at the UE based on the selected UE category; and
   performing LBRM based on the determined total number of soft channel bits.

2. The method of claim 1, wherein the UE selects UE category 11 or UE category 12 from the plurality of UE categories when at least one of the UE category 11 or the UE category 12 is reported to the eNB, and said signaling is received from the eNB.

3. The method of claim 2, wherein the UE determines the total number of soft channel bits to use for LBRM at the UE based on the selected UE category 11 or the UE category 12.

4. The method of claim 1, wherein the UE category is selected further based on whether transmission mode 9 is configured for the UE when said signaling is not received from the eNB.

5. The method of claim 4, wherein the UE category 6 is selected when transmission mode 9 is configured for the UE and said signaling is not received from the eNB.

6. The method of claim 4, wherein the UE category 4 is selected when transmission mode 9 is unconfigured for the UE and said signaling is not received from the eNB.

7. The method of claim 1, further comprising determining whether the UE is configured with 256 quadrature amplitude modulation (QAM), wherein the signaling in relation to the UE categories is determined to be received from the eNB when the UE is configured with 256 QAM.

8. An apparatus for performing limited buffer rate matching (LBRM), the apparatus being a user equipment (UE), comprising:
a memory; and
at least one processor coupled to the memory and configured to:
report a plurality of UE categories to an evolved Node B (eNB);
determine whether signaling in relation to the UE categories indicates a particular channel quality information (CQI) table;
select a highest UE category from the plurality of UE categories when said signaling indicates the particular CQI table;
select a UE category other than the highest UE category from the plurality of UE categories when said signaling does not indicate the particular CQI table;
determine a total number of soft channel bits to use for LBRM at the UE based on the selected UE category; and
perform LBRM based on the determined total number of soft channel bits.

9. The apparatus of claim 8, wherein the UE selects UE category 11 or UE category 12 from the plurality of UE categories when at least one of the UE category 11 or the UE category 12 is reported to the eNB, and said signaling is received from the eNB.

10. The apparatus of claim 9, wherein the UE determines the total number of soft channel bits to use for LBRM at the UE based on the selected UE category 11 or the UE category 12.

11. The apparatus of claim 8, wherein the UE category is selected further based on whether transmission mode 9 is configured for the UE when said signaling is not received from the eNB.

12. The apparatus of claim 11, wherein the UE category 6 is selected when transmission mode 9 is configured for the UE and said signaling is not received from the eNB.

13. The apparatus of claim 11, wherein the UE category 4 is selected when transmission mode 9 is unconfigured for the UE and said signaling is not received from the eNB.

14. The apparatus of claim 8, wherein the at least one processor is further configured to determine whether the UE is configured with 256 quadrature amplitude modulation (QAM), wherein the signaling in relation to the UE categories is determined to be received from the eNB when the UE is configured with 256 QAM.

15. An apparatus for performing limited buffer rate matching (LBRM), the apparatus being a user equipment (UE), comprising:
means for reporting a plurality of UE categories to an evolved Node B (eNB);
means for determining whether signaling in relation to the UE categories indicates a particular channel quality information (CQI) table;
means for selecting a highest UE category from the plurality of UE categories when said signaling indicates the particular CQI table;
means for selecting a UE category other than the highest UE category from the plurality of UE categories when said signaling does not indicate the particular CQI table;
means for determining a total number of soft channel bits to use for LBRM at the UE based on the selected UE category; and
means for performing LBRM based on the determined total number of soft channel bits.

16. The apparatus of claim 15, wherein the UE selects UE category 11 or UE category 12 from the plurality of UE categories when at least one of the UE category 11 or the UE category 12 is reported to the eNB, and said signaling is received from the eNB.

17. The apparatus of claim 16, wherein the UE determines the total number of soft channel bits to use for LBRM at the UE based on the selected UE category 11 or the UE category 12.

18. The apparatus of claim 15, wherein the UE category is selected further based on whether transmission mode 9 is configured for the UE when said signaling is not received from the eNB.

19. The apparatus of claim 18, wherein the UE category 6 is selected when transmission mode 9 is configured for the UE and said signaling is not received from the eNB.

20. The apparatus of claim 18, wherein the UE category 4 is selected when transmission mode 9 is unconfigured for the UE and said signaling is not received from the eNB.

21. The apparatus of claim 15, further comprising means for determining whether the UE is configured with 256 quadrature amplitude modulation (QAM), wherein the signaling in relation to the UE categories is determined to be received from the eNB when the UE is configured with 256 QAM.

22. A non-transitory, computer-readable medium storing computer executable code for performing limited buffer rate matching (LBRM) by a user equipment (UE), comprising code for:
determining whether signaling in relation to the UE categories indicates a particular channel quality information (CQI) table;
selecting a highest UE category from the plurality of UE categories when said signaling indicates the particular CQI table;
selecting a UE category other than the highest UE category from the plurality of UE categories when said signaling does not indicate the particular CQI table;
determining a total number of soft channel bits to use for LBRM at the UE based on the selected UE category; and
performing LBRM based on the determined total number of soft channel bits.

23. The computer-readable medium of claim 22, wherein the UE selects UE category 11 or UE category 12 from the plurality of UE categories when at least one of the UE category 11 or the UE category 12 is reported to the eNB, and said signaling is received from the eNB.

24. The computer-readable medium of claim 23, wherein the UE determines the total number of soft channel bits to use for LBRM at the UE based on the selected UE category 11 or the UE category 12.

25. The computer-readable medium of claim 22, wherein the UE category is selected further based on whether transmission mode 9 is configured for the UE when said signaling is not received from the eNB.

26. The computer-readable medium of claim 25, wherein the UE category 6 is selected when transmission mode 9 is configured for the UE and said signaling is not received from the eNB.

27. The computer-readable medium of claim 25, wherein the UE category 4 is selected when transmission mode 9 is unconfigured for the UE and said signaling is not received from the eNB.

28. The computer-readable medium of claim 22, further comprising determining whether the UE is configured with 256 quadrature amplitude modulation (QAM), wherein the signaling in relation to the UE categories is determined to be received from the eNB when the UE is configured with 256 QAM.

* * * * *